[11] 3,623,788

[72] Inventors Kenneth A. Snow
Greece;
Richard E. Vandewarker, Rochester, both of N.Y.
[21] Appl. No. 814,147
[22] Filed Apr. 7, 1969
[45] Patented Nov. 30, 1971
[73] Assignee Bausch & Lomb Incorporated
Rochester, N.Y.

[54] LOW ANGLE HOLOGRAPHIC APPARATUS
13 Claims, 5 Drawing Figs.
[52] U.S. Cl. .................................................. 350/3.5
[51] Int. Cl. ............................................. G02b 27/00
[50] Field of Search .......................................... 350/3.5

[56] References Cited
OTHER REFERENCES

Denisyuk " On the Reproduction of the Optical Properties of an Object by the Wave Field of Its Scattered Radiation," Optics & Spectroscopy, Vol. 15, No. 4, Oct., 1963, pp. 270–284. 350–3.5.

Wilmot et al., " Hologram Illumination with a Flashlight," Proceedings of the IEEE, Vol. 54, No. 4, pp. 690–691, April, 1966. 350–3.5.

Supertzi et al., " Wide-Angle Holography," Journal of the Optical Society of America, Vol. 56, No. 4, April, 1966, pp. 524–525. 350–3.5. (both pages appear on one page in reprint form)

Primary Examiner—John K. Corbin
Attorneys—Frank C. Parker and Bernard L. Sweeney ABSTRACT: Apparatus forms a reflective subject hologram for use with a source of heterochromatic light in the subsequent reconstruction process. The apparatus provides for causing the rays reflected from the subject to interfere with reference rays, at the holographic surface, at a low angle. The low angle is formed by projecting a divergent laser beam through the surface of the hologram, the reference rays being subsequently retroreflected to the hologram surface to interfere with the rays reflected from the subject.

PATENTED NOV 30 1971 3,623,788

KENNETH A. SNOW
RICHARD E. VANDEWARKER
INVENTORS

BY *Bernard J. [signature]*

AGENT

KENNETH A. SNOW
RICHARD E. VANDEWARKER
INVENTORS

BY
AGENT

LOW ANGLE HOLOGRAPHIC APPARATUS

CROSS-REFERENCES TO RELATED APPLICATIONS

This application is a continuation-in-part application of our copending application, Ser. No. 572,048, filed Aug. 12, 1966, entitled, "Holography" now abandoned.

BACKGROUND OF THE INVENTION

1. Field of the Invention

This invention relates to holography and laser photography. In particular, a new technique has been developed for forming holograms of opaque objects which may be reconstructed into a three dimensional image using heterochromatic light. This is accomplished by forming holograms which have low spatial frequency interference patterns recorded thereon. The low spatial frequency interference patterns with their characteristically greater spacings between the adjacent recorded fringes allows reconstruction of the images with white light.

2. Brief Description of the Prior Art

The methods of the present invention contrast sharply with the methods used previously for reconstructing holograms of reflective subjects which required a similar coherent source of light, such as a laser beam, to that used to form the hologram. The present invention provides for the new hologram to be reconstructed outside of the laboratory environment.

The reconstruction of three dimensional images from interference patterns recorded on a two dimensional surface was first reported by D. Gabor in the *Proceeding of the Royal Society* (London), Section A, Vol. 197 (1949), at pages 454 to 487, and the term "hologram" was used by Gabor to identify the film record containing the interference patterns. The basic theory of holographic wave interference was then derived from classical optics and the "lensless" camera was proposed. One of the requirements set forth for holography was and is that the light source used to form the hologram must be highly coherent. That is, the bandwidth of the radiation must be very narrow, typically about 1 A, termed temporal coherence, and the rays must be focusable at a point, termed spatial coherence. However, until the invention of the laser, no satisfactorily efficient or coherent source of electromagnetic radiation existed to produce high-resolution holograms. The Gabor hologram was also limited to use with transparent subjects such as those found in microscopy.

The successful use of a laser source for producing holograms of opaque subjects was disclosed by E. N. Leith and J. Upatnieks, in an article entitled "Wave front Reconstruction with Diffused Illumination and Three-Dimensional Objects," published in the *Journal of the Optical Society of America*, Vol. 54, No. 11, at pp. 1295–1301 (1964). By using transparent holographic substrates which have high-resolution photographic layers, as have most workers in the field, and by carefully controlling the dimensional variations of the optical system of the "lensless" camera, reflected light waves from an opaque subject were superimposed with a uniform wave front of reference light, both of which emanate from the same coherent source. The resulting interference patterns were recorded by the photosensitive layer of the holographic surface. The pattern thus formed on the surface is unintelligible as such to the naked eye. However, when another beam of laser light was passed through the transparent hologram, the waves were diffracted as they passed through the relatively transparent areas of the hologram in the vicinity of the opaque areas of the film. This results in space amplitude modulation of the first order, waves emerging from the rear surface of the hologram. These amplitude variations allow the observer to see a three dimensional image of the subject.

The apparatus utilized to form a hologram of a diffusely reflecting object is shown in FIG. 1. It is helpful to briefly discuss the operation of this apparatus in order to explain hereinafter the significance of the novel apparatus. A laser 10 is utilized to provide a beam of monochromatic, spatially coherent light which is converged to a point 30 by a suitable optical means 12. This divergent beam, beyond point 30, illuminates a diffusely reflecting subject 14 and a plane mirror 18 which are divergently positioned with respect to the divergent beam. It is desirable to form a hologram on a photographic plate 16. For the purposes of illustration, typical rays 20, 22 and 24 will be considered. Ray 20 strikes the subject 14 and is diffusely reflected by the surface in all directions. Reflected ray $20a$ reaches a typical point 26 on the holographic plate 16 where it interferes with a ray $22a$ which has been reflected by the mirror 18 and an interference pattern is recorded on the film at that point. In like manner, another ray $20b$, which also emanates from the identical point on the subject 14 as does ray $20a$, interferes with reflected ray $24a$ at a second typical point 28 on the holographic plate 16. The interfering rays $20a$ and $22a$ intersect at an angle $\alpha_{20-22}$ and rays $20b$ and $24a$ at an angle $\alpha_{20-24}$.

It can be seen that $\alpha_{20-22}$ and $\alpha_{20-24}$ are relatively wide angles of intersection. These wide angles of intersection give rise to interference patterns having high spatial frequencies. This can be seen, in FIG. 2, for the case of a pair of identical monochromatic plane waves 42 and 44 which intersect at a relatively wide angle on a screen 40. The lines delineate isophase surfaces. When these points are chosen as amplitude peaks, their intersections mark constructive interferences and the resulting enhanced energy levels form a series of fringes 46 which are separated by a spacing $d_1$.

In FIG. 3, a narrower angle exists between schematically depicted waves 48 and 50. It can be seen that a spacing $d_2$ between adjacent fringes 46 is now greater than the spacing in FIG. 2. The spacings $d_1$ and $d_2$ are the periods associated with the spatial frequencies of the interference patterns. Therefore, the spatial frequency of a holographic interference pattern is directly proportional to the angle subtended by the reference beam and the reflected interferring beam from the subject.

Detailed analyses of the optical theories of the recording and reconstruction processes have been presented by Y. N. Denisyuk, in an article entitled "On the Reproduction of the Optical Properties of an Object by the Wave Field of Its Scattered Radiation," published in *Optics and Spectroscopy*, Vol. 15, No. 4, at pp. 279–284 (Oct. 1963), and by E. N. Leith and J. Upatnieks, in an article entitled "Photography by Laser," published in *Scientific American*, Vol. 212, No. 6, at pp. 24–35 (June 1965). Only brief references will be made herein to these generally accepted theories of wave front reconstruction in describing the invention.

There have been two general methods for reconstructing holograms. The first utilizes highly coherent laser light passed through a transparent film having opaque interference patterns. The diffraction of the light passing the opaque material results in interferences beyond the hologram which may be observed with the eye or by a camera. The viewer assumes a position with the transparent hologram between the viewing position and the reconstruction light source. By shifting the viewing angle, different parallax effects and stereoscopic views may be seen. These images are very real in appearance and the viewer can actually look around the objects in a recorded scene.

Both the Gabor and Leith et al. type holograms are reconstructed using this general technique. Reconstruction of the Gabor-type hologram is an "in-line" arrangement in which both real and virtual images are generated and are superimposed on each other except at different focal distances. Each image may be separately viewed; however, the other image, although blurred, is always present.

Leith and Upatnieks teach a reconstruction process in which the real and virtual images are again formed; however, because of the relatively high spatial frequencies recorded on the hologram, the diffracted rays which form the respective images are widely divergent and the images do not interfere with each other. In addition, the relatively high spatial frequencies recorded on the Leith et al. hologram requires the use of a highly coherent source of light to reconstruct a suitable image. If heterochromatic light is utilized, an array of superimposed images is obtained, one attributable to each separate wavelength of light contained in the heterochromatic beam. This is analogous to a diffraction grating, where the closer the rulings are spaced relative to each other, the greater the separation of the colors of the spectrum when the grating is illuminated with a beam of white light. Similarly, if the spacings in the grating are increased, the angle of diffraction of the rays decreases along with the color separation. Therefore, one would tend to think that if the input beam were to be brought nearer to the axis normal to the hologram that the recorded spatial frequency could be lowered and this is true; however, the recorded frequency remains high and the size of the holographic plate that can be utilized diminishes. Secondarily, the subject might be brought nearer the normal as well; however, now the subject throws a shadow on the mirror which destroys much of the quality of the resultant hologram. Therefore, it would be difficult to form a hologram using the Leith et al. technique which could be reconstructed using heterochromatic light.

The use of heterochromatic light for the reconstruction of a hologram requires a compromise to be made between the resolution of the hologram and the clarity of the image. If the spatial frequency is too high, a blurring of the image occurs because of the separation of colors by the interference pattern. If the spatial frequency is too low, a very poor image is attained with either heterochromatic or monochromatic light, due to the slight degree of diffraction.

The second reconstruction method presently being used is that for a Denisyuk-type hologram. Denisyuk-type holograms are formed by splitting the laser beam into two beams, one of which is reflected from the subject onto the front surface of a transparent holographic plate and substantially normal to that surface. The remainder of the laser beam becomes a uniform reference beam which is directed normal to the rear surface of the holographic plate. The two beams then interfere in the photosensitive surface where a standing wave pattern has been formed by the two interfering beams. The effect of these standing wave patterns when recorded by the photosensitive emulsion is to form a type of a multilayer filter. The wave patterns are formed every half-wavelength of the wavelength of radiation used to form the hologram.

As is known in the art, such a multilayer filter will reflect only the light having a half-wavelength equal to the spacings in the multilayer filter. Therefore, the Denisyuk-type hologram may be reconstructed by directing white light at the hologram, provided that the spectrum contains the wavelength of light used to form the hologram, as the hologram will only reflect that one wavelength of light. While this may appear to have many advantages to the Leith et al. technique, there are difficulties encountered as well, the requirement that the reconstructing radiation source contain the wavelength of radiation used to form the hologram eliminates one of the advantages of the hologram. The Leith et al. hologram may be formed with one wavelength of radiation and reconstructed with another, i.e., X-ray formation and visible light reconstruction. The Denisyuk-type hologram also imposes severe limitations in viewing position to realize the three dimensional effects of the reflected image.

SUMMARY OF THE INVENTION

It has been discovered that holograms may be constructed in a modified "lensless" camera apparatus using highly coherent electromagnetic radiation, such as a laser source, to produce a hologram capable of being reconstructed by heterochromatic radiation, including ordinary white light, projected through the hologram contained on a transparent substrate. The geometry of the holographic camera is such that an interference pattern is setup between a uniform reference wave and reflected waves from a reflective object in such manner that a large portion of the interfering rays in the hologram approach the light-sensitive holographic recording surface at narrow angles with respect to one another. This has been observed to produce a low spatial frequency between the interference fringes in the hologram, an observation that can be made under a microscope. The discovery that transparent holograms can be reconstructed using heterochromatic light removes the reconstruction process from the laboratory environment to which holograms have been confined during the early stages of development. Although an equivalent degree of spatial and temporal coherence is needed to construct the novel holograms as in the past, this can be accomplished on a relatively high production basis. Once the first hologram of a series is made according to this invention, the process may be repeated with ease in making duplicate originals, or contact printing may be used in reproducing the holograms. The reconstruction apparatus is easily assembled from available components. A simple mounting for the hologram structure and an incandescent lamp are all that are required to provide suitable heterochromatic radiation for reconstruction.

The term "heterochromatic" when used with the term "radiation" is intended to embrace numerous forms of electromagnetic radiation. Ordinary white light such as that generated by an incandescent lamp or fluorescent lamp is considered heterochromatic in that it contains many wavelengths of light. The term "coherence" has been used widely but sometimes inaccurately in describing light, particularly for lasers. Temporal coherence refers to the property of a wave often known as monochromaticity, or more simply stated that, the wavelength band of such light is very narrow. Heterochromaticity is opposite in meaning to temporal coherence. Another coherence property of light is its spatial coherence. Traditionally, light having high spatial coherence is capable of being focused to a small area. Such light can be derived from a point source. A mixture of narrow bandwidth waves can also be considered as heterochromatic light, as well as the more complex spectra. Filtered white light is another easily generated source of reconstruction waves. It should be apparent that the main advantage of the invention lies in the property of the novel holograms of being reconstructed by any available light including that from the highly coherent laser beam to the complex spectrum of white light. Satisfactory reconstruction may be obtained with a large diffuse light bulb through an aperture, or even with sunlight.

Accordingly, it is an object of the present invention to provide apparatus for producing holograms of reflective objects, the holograms being capable of being reconstructed with heterochromatic light.

Another object of this invention is to provide such apparatus which is able to form holograms of reflective objects from the interference patterns formed by interfering rays converging onto a holographic surface sensitive to electromagnetic radiation at narrow angles.

A further object of the invention is to provide such apparatus which generates holograms having low spatial frequency interference patterns recorded thereon.

Briefly, the invention in its broadest aspect comprises apparatus for producing a hologram of a reflective object where the hologram is capable of being reconstructed with heterochromatic light. The apparatus includes the combination of the following elements. A source of a beam of electromagnetic radiation is provided which has both temporal coherence and spatial coherence. Apparatus is included for projecting the beam from a point toward the reflective object in a uniformly divergent pattern about an optical axis. A holographic surface intersects the optical axis adjacent to the point; the holographic surface is responsive to the electromagnetic radiation and is exposed to radiation reflected from the object. Finally, other apparatus is included for reflecting a portion of the projected radiation onto the holographic surface as a uniform reference beam to interfere at the holographic surface with radiation reflected from the object, a large portion of the interfering rays converging onto the holographic surface at narrow angles.

Further objects, advantages and features of the invention will be apparent in the arrangement and construction of the constituent parts in detail as set forth in the following specification taken together with the accompanying drawing.

DETAILED DESCRIPTION OF THE PREFERRED EMBODIMENT

Figure 1:
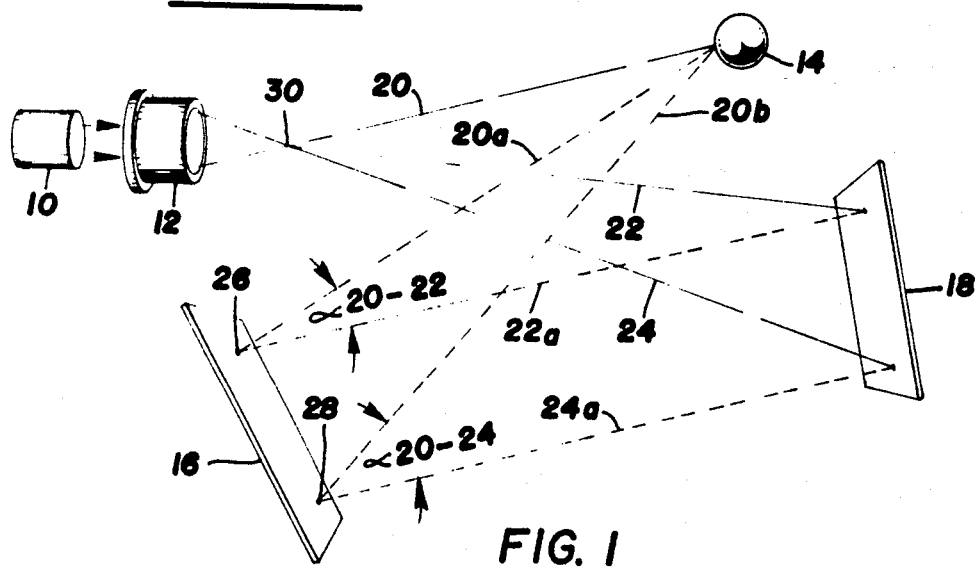
FIG. 1 is a perspective schematic representation of prior art apparatus for forming holograms of reflective objects, this figure is discussed with relationship to the prior art.
Figure 2:
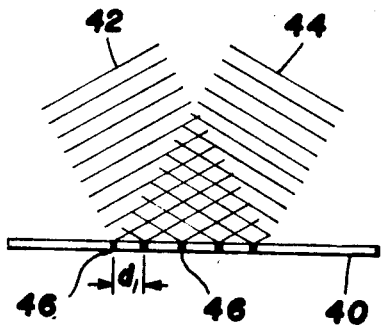
FIGS. 2 and 3 show schematically the interference fringes formed by intersecting isophase waves at different convergence angles, these figures are also discussed with relationship to the prior art.
Figure 3:
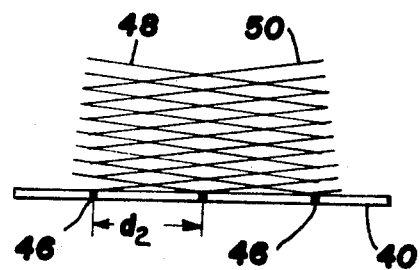

The analogies and differences between ordinary photography and "lensless" holographic photography present a convenient point of departure for discussing the present invention. In photographic processes, as they had existed until the hologram, reflected light from a subject in a scene was focused onto a photosensitive plate to form an image. The actinic nature of electromagnetic rays caused a chemical reaction which could be selectively developed to produce a record of the object as seen from the vantage point of the focusing means, such as a lens or pin hole. In viewing the image on a photographic print, light was reflected or diffused from each point on the print to the viewing position. Essentially the same image was seen from any viewing position. In holography the image of the subject is not recorded, but rather, a two dimensional record of the interference fringes produced by the interactions between the coherent radiation reflected from the surface of the object and a reference wave of uniform monochromatic light having a high degree of spatial coherence. The interferences are sensed by materials located in a surface, such as photographic film. After developing, the hologram, as it is called at this point, does not contain intelligible images. The hologram image information is merely a pattern of interference fringes. When viewed in diffused light, to the ordinary eye the opacity hologram bears no relation to the original scene, and the only discernable pattern is actually related to undesirable stray light generated, for example, by dust, in the optics of the "lensless" camera. However, in most instances the presence of low-level stray light during the construction process does not adversely affect the three dimensional image during reconstruction.

In order to appreciate the difficulties encountered in holographic reconstructions, it is advantageous to consider the differences between the interference patterns created by reflected light from an object, in contrast with similar patterns made by diffraction of monochromatic light passing through a transparent specimen. The former can be called reflective subject holography and the latter transparent subject holography. Transparent subject holography is explained in detail by H. M. El-Sum in U.S. Pat. No. 3,083,615, issued Apr. 2, 1963. Using particular rigid geometric relations, H. M. El-Sum shows the reconstruction of transparent holograms with white light. In such reconstructions and in the recording process also, the light source, object (or conjugate object) and holographic plate must be aligned axially with precise distances between the elements. Also, it should be pointed out that the above-described transparent subject hologram is not constructed using a modulated carrier wave, but depends upon monochromatic diffraction alone to create the interferences. Significant differences lie between the two types of holograms, and the inherent limitations of transparent subject holography have confined it largely to microscope technology.

The departure proposed by E N. Leith and J. Upatnieks which accounts for a large measure of the recent successes of reflective object laser holography, stems from the use of a uniform reference wave intersecting with the subject waves at the holographic surface. The reflected subject wave front, when it interferes with the uniform reference wave, produces a set of interference fringes. The angular relationship of the subject and reference waves, as was described above, is recorded as the spatial frequency of the recorded fringes. The intensity of the reflected subject wave front is recorded by the holographic surface as the contrast of the recorded fringe pattern. Hence, all of the information concerning the reflective object is recorded on the hologram. Such interference phenomena have been compared with a modulated carrier such as used in radio frequency waves. Hence, the term FM hologram is often applied.

The reconstruction phenomenon of all known holograms depends upon diffraction of rays while passing through the hologram recording. When the hologram is a series of opaque or light-blocking dots, the diffraction angle $\theta$ is found from the following relationship:

$\sin \theta = n\lambda/d;$ where $n$ is an integer ($\pm 1, \pm 2$, etc.), where $\lambda$ is the wavelength of radiation, and where $d$ is the spacing between adjacent opaque spots.

A midspectrum wavelength $\lambda$ of visible light would have a value of about 0.5 micron, and for a typical reflective subject hologram, according to this invention, the average spacing should be of the order of about 5 microns or greater for good heterochromatic reconstruction. Thus, a first order wave generated by diffraction through holograms produced by this invention would have a small diffraction angle compared to the prior reflective subject holograms prepared by E. N. Leith and others. The virtual image reconstructed from first-order white light waves should be viewed from a position somewhat more distant from the hologram surface than when using monochromatic light.

Figure 4:
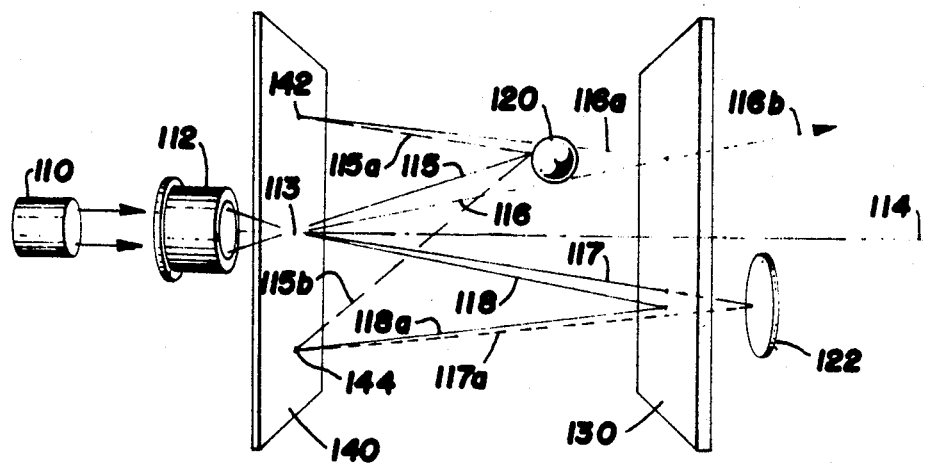
FIG. 4 is a schematic perspective view of apparatus according to the principles of the present invention for producing holograms and showing typical ray traces of the coherent light source in the construction of holograms; an FIG. 5 shows the reconstruction of the holograms constructed by the apparatus shown in FIG. 4 by heterochromatic light, including the three dimensional images formed.

Referring now to the drawing, FIG. 4 shows a schematic perspective view of an apparatus constructed according to the principles of the present invention and used in constructing the new holograms. An output beam from a suitable source of electromagnetic radiation having high temporal and spatial coherence, such as a laser 110, is directed toward the subjects to be recorded. An apparatus 112 is provided for converging the radiation from the source 110 to a point 113 on an optical axis 114. The radiation is projected from the point 113 in a divergent uniform distribution pattern centered about the optical axis 114, and typical ray traces 115, 116, 117 and 118 are shown in the dispersion pattern. In order to demonstrate the differences between the properties of diffuse and specular reflecting objects, each of these is shown, a first object 120, in the form of a diffusing surface sphere, is positioned in the foreground of the scene, and a second object 122, such as a specular reflecting metal disc, is disposed in the background.

An important feature of the invention lies in the positioning of a beam divider 130 relative to the objects in the scene. This element of the optical construction system provides the necessary uniform reference wave for interfering with the rays reflected from the objects 120 and 122. The beam divider 130 should be positioned so that the differences in the path lengths of the interfering rays fall within the coherence path length of the laser 110. The beam divider, in the preferred embodiment, comprises structure for reflecting a portion of the projected radiation onto a holographic radiation sensitive surface 140. As shown in FIG. 4, the beam divider 130 is a flat plane surface positioned between the foreground object 120 and the background object 122 to illustrate the function of the various beam divider positions. Both the optical reflecting surface 130 and the holographic surface 140 are preferably substantially perpendicular to the optical axis 114 of the system. These are disposed within about 3° of normal, in the preferred embodiment to assure that interfering rays intersect the holographic surface 140 at narrow convergence angles to provide relatively low spatial frequencies for the interference fringes. However, both the reflecting surface 130 and the holographic surface 140 may be positioned at greater angles of inclination although the tilt of surface 130 is more critical than the tilt of surface 140. With greater tilt, the object position becomes more limited.

The holographic surface 140 is preferably located at or in proximity to the projection point 113 so that a large area of the hologram is not darkened by the laser beam. The point 113 might be located well off the surface 140 if the image quality is allowed to deteriorate.

To demonstrate the intersecting waves from different reflective surfaces, a typical ray trace 115 is shown directed toward the diffusing surface sphere 120. Since such surfaces reflect electromagnetic radiation in numerous directions, according to the Rayleigh scattering formula, these scattered rays reach every point on the hologram 140. Two typical low intensity reflected rays 115a and 115b are illustrated. The reflected ray 115a forms an interference pattern at a point 142 on the holographic surface 140 with a reference ray 116a. This reference ray represents a portion of the energy of the initial ray 116, which is split into two portions 116a and 116b, the latter passing through the mirror surface 130 and leaving the system. The narrow angle between the rays 115a and 116a should be noted with respect to the resulting recorded spatial frequency. A second scattered ray 115b of low intensity intersects the holographic surface 140 to become a constituent of another interference pattern formed at a point 144. It should also be noted at this point, that if the objects in the scene are entirely located between the surfaces 130 and 140, surface 140 may then be a totally reflecting element if desired.

The specular reflectance pattern of the background object 122 is somewhat different from that of the diffusing object 120. The typical projected ray 117 passes through the beam divider 130 and strikes the object 122 from which it is reflected at an angle opposite to its angle of incidence upon the specular surface. Little or no scattering occurs, resulting in a high-intensity ray 117a reaching the surface of the hologram 140. A reference ray 118a is reflected from the mirror surface 130 at substantially the same angle to the optical axis as the ray 117a. The convergence of the rays 115b, 117a, and 118a at the holographic surface 140 produces an interference pattern at the point 144, dominated by the pattern generated by the strong rays 117a and 118a. The strongest interference patterns are made by the high-intensity rays, largely suppressing wide-angle diffused rays, such as 115b. It should be noted that the invention is not limited to the placement of specular objects behind the surface 130 and diffusing surfaces in front, but includes either type of surface in either position.

The ratio of reflected light to transmitted light in beam divider 130 varies widely according to the environment in which it is used. It is desirable to have nearly equal intensities between the reference waves and the subject waves at the hologram surface 140 in order to realize a strong contrast between constructive and destructive interferences. When a specular surface is positioned very near the beam splitter 130, good results are obtained with a 50:50 ratio. If the beam dividing mirror 130 is placed well behind the object, higher or even total reflectance may be desired. Since the rays reflected by diffuse surfaces have lower amplitudes due to the scattering, their amplitudes can be more closely matched by a low-reflectance mirror. For many applications ordinary optical glass having about 4 percent reflectivity is satisfactory. A beam divider position between the projection point 113 and the objects in the scene is preferred, because no shadow is thrown onto the surface 130 by the object.

The beam divider 130 and the holographic surface 140 need not be completely flat to achieve the desired reconstruction results. A surface that is slightly concave or convex spherically can produce a desirable reference wave front at the radiation sensitive surface of the hologram 140. The several design factors permit a degree of flexibility in the apparatus; however, a large portion of the interfering rays converging on the holographic surface should meet at a narrow angle.

In selecting the mirror position one should consider that a shadow is cast on the hologram 140 if the object is positioned between the projection point 113 and the dividing mirror 130. But this does not obliterate the object during reconstruction, since diffuse objects reflect light to all points on the hologram 140, and the information necessary for reconstructing holograms of diffuse surfaces is present in any portion of the holographic surface 140.

Figure 5:
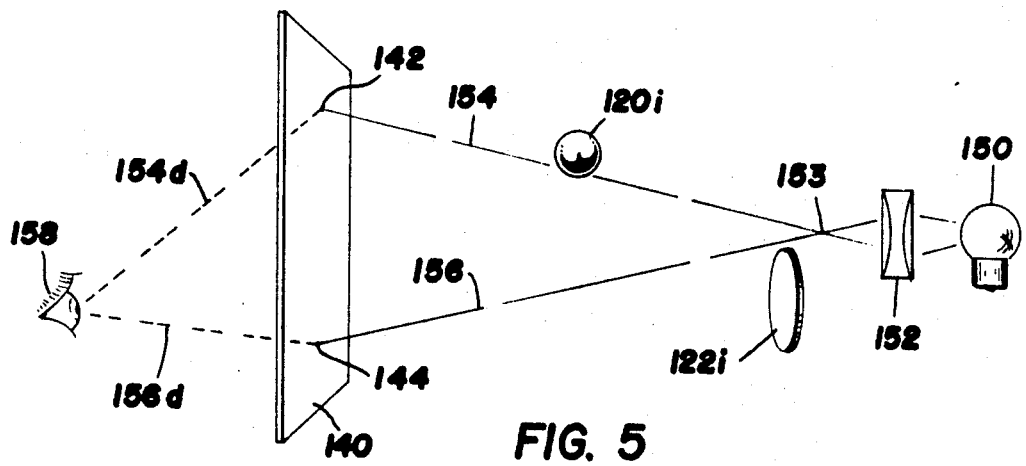

The reconstruction process of the reflective subject holograms is shown in FIG. 5. The hologram 140 is supported on a transparent substrate. Usually a source of heterochromatic radiation, such as a white light bulb 150, is positioned on the same side of the surface exposed during recording and approximately aligned with the original optical axis 114 of the hologram recording apparatus. Sufficient spatial coherence may be imparted by a condensing lens 152, which converges the light rays to a focal point 153. Typical light rays 154 and 156 are shown as they are diffracted by interference patterns at points 142 and 144. First order diffraction fay traces 154d and 156d converge at a viewing position 158 (shown foreshortened in the schematic drawing), where a photosensitive receiver, such as an eye, views the reconstructed images. To the viewer, the appearance of the original scene is that of looking through a window, represented by the transparent substrate carrying the hologram 140. Images 120i and 122i of the sphere 120 and the specular disc 122 are endowed with all the visual properties of the original objects, including parallax and depth of field. In like manner, the appearance of the specular image is substantially the same as the object itself. The diffusing object image is reconstructed in black and white. The spatial coherence requirements for the heterochromatic light source need not be as high as for a similar reconstruction using off-axis reflective subject holography. A diffuse surface lamp may be used with an aperture as a substitute for the source 150 and condensing lens 152 in FIG. 5. Also, a spatially coherent collimated beam is suitable.

It may be seen that the apparatus according to this invention has the capability of recording scenes including objects which are located on the optical axis. The usual double image problems which occur with "in-line" systems remain; however, this apparatus, because it is a reflected light interference pattern, not transmitted, as in the hereinbefore mentioned Gabor disclosure, allows for the shifting of the object slightly off axis to eliminate this double image problem.

Prior to this invention it has been widely believed that only very high resolution photographic film could be used for reflective subject holography. The Eastman Kodak 649F spectroscopic plates commonly used by workers in this field of technology have been reported to have a resolution in excess of 10,000 lines per millimeter. Microscope observations of the fringe patterns in the holograms produced according to this invention show an average fringe spacing of less than 200 lines/mm. The high resolution photoresponsive surfaces of the prior art were necessarily slow, resulting in long exposure times and stray light problems. By relaxing the resolution requirements of the film, shorter exposure times may be employed. Under magnification the holographic surface of a developed film hologram contains a definite fringe pattern which can be measured by ordinary laboratory equipment. The minimum average spacing between interference spots would be about 5 microns, corresponding to a maximum average spatial frequency of about 200 lines/mm. The developed photographic emulsion containing the holographic record has a thickness of about 5 to 10 microns.

For example, a hologram was constructed of a scene including several silver coins having a specular reflecting surface. The electromagnetic radiation source was a helium-neon gas laser emitting red light in a narrow band at 6328 A. The output power of this source was 3 milliwatts. The apparatus shown in FIG. 1 was assembled in a controlled environment to minimize mechanical vibration, temperature variations, etc., in the conventional manner. The laser beam was directed along the optical axis of a 10X microscope objective lens which was focused to a small point in the plane of the holographic surface. This avoids excessive stray light patterns on the hologram. Any equivalent means for converging the coherent rays at a point on the optical axis will be effective for the purposes of this invention. Light is emitted from this projected point in a uniform conical pattern evenly distributed about the optical axis. Hence, an important distinction between the heterochromatic reflective subject holograms of this invention and previous constructions is the dispersion of coherent light adjacent to the hologram surface.

A flat beam divider was mounted about 60 mm. from the projection point perpendicular to the optical axis of the system. The coins were placed a few millimeters directly behind the beam divider. These distances are merely given by way of example for the particular radiation source and geometry employed.

The holographic surface responsive to the electromagnetic radiation was a transparent photographic plate having the emulsion on one side exposed to radiation from the reflective objects and the reflected portion of reference waves from the beam divider. A standard Kodak 649F spectroscopic plate was mounted rigidly in a plane perpendicular to the optical axis of the system and intersecting the axis at the point of convergence of the laser beam emerging from the objective lens. In this preferred position the holographic surface is substantially parallel to the beam splitter. The photographic plate has a substrate of glass 4 in. X 5 in. X 0.04 in., and the photosensitive emulsion is several microns thick. An exposure time of 1 to 5 minutes is satisfactory for this particular example.

After developing the exposed hologram by standard photographic procedures, the hologram was reconstructed by incandescent white light. This heterochromatic light was provided from an ordinary light bulb with a condensing lens located about 20–40 cm. behind the hologram from the viewing position. The best viewing position for the virtual image was found to be about 2–3 meters.

The wavelengths used for constructing the holograms need not be limited to the visible band. Stimulated emission devices produce a wide choice of actinic radiation bands having the desired coherence properties. Various masers and other emitters are capable of providing infrared, ultraviolet and other invisible rays. Numerous sources can be used for emitting coherent gamma and X-rays.

While most of the work in holography has centered about holograms having light-blocking opaque or semiopaque spots, the diffraction of reconstruction waves may be achieved by other optical phenomena. In the *Journal of the Optical Society of America*, Vol. 55, p. 457 (1965), W. T. Cathey, Jr. disclosed that almost completely transparent holograms may be produced by bleaching the photographic emulsion. The necessary diffraction is provided by variation in emulsion thickness and refractive index of the bleached hologram. In this manner spatial amplitude modulation is eliminated and spatial phase modulation alone is used for the reconstruction process. Stray light patterns are opaque in nature and may be eliminated without hindering the reconstruction. If such holographic techniques are employed the projection point need not be confined to the intersection between the holographic plate and the optical axis during the initial construction process. As a corollary to this matter, the attenuation of reconstruction light is decreased, producing more luminous images. The contrast properties of the film do not affect the tonal characteristics of the image. Heterochromatic holograms may also be reconstructed with monochromatic light, but in doing so, the advantages of a nonlaboratory environment gained by the invention are lost. Contact printing may be employed to reproduce the hologram while retaining the "positive" characteristics of such holograms. This results from the low spatial frequency interference patterns recorded on the hologram.

The hologram formed by the invention is achromatic in that all wavelengths of the white light continuum passing through the diffraction plate are recombined in the image space to form black and white images. This property of the low spatial frequency holograms is attributed to the particular geometry of the recording apparatus in that by restricting the angles subtended between the interfering rays to minimal values, such low spatial frequency interference patterns are generated.

While there has been shown and described what is considered to be a preferred embodiment of the present invention, it will be obvious to those skilled in the art that various changes and modifications may be made therein without departing from the invention.

We claim:

1. Apparatus for producing a hologram of a reflective object, the hologram being reconstructable with heterochromatic light, the apparatus comprising in combination:

a laser which emits a beam of monochromatic, spatially coherent light;

a photosensitive planar holographic surface interposed between the laser and the reflective object;

optical means aligned on an optical axis coincident with the axis of the laser beam to converge the beam to a projection point which is approximately coincident with the photosensitive holographic surface and centrally located thereon, the divergent beam which emanates from the projection point illuminating the reflective object; and a partially reflecting mirror which is substantially perpendicular to the optical axis and which reflects a portion of the projected divergent laser beam onto the holographic surface to interfere at the holographic surface with the light reflected from the object onto the holographic surface, the difference between the path lengths of the interfering rays falling within the coherence path length of the laser, and a predominance of the interfering rays converging onto the holographic surface at narrow angles.

2. Apparatus according to claim 1 in which the photosensitive holographic surface is approximately perpendicular to the optical axis.

3. Apparatus according to claim 1 in which the partially reflecting mirror is located between the photosensitive holographic surface and the reflective object.

4. Apparatus according to claim 1 in which the reflective object is located between the photosensitive holographic surface and the partially reflecting mirror.

5. Apparatus according to claim 1 in which the reflective object is located on both sides of the partially reflecting mirror.

6. Apparatus for producing a hologram of a reflective object, the hologram being reconstructable with heterochromatic light, the apparatus comprising in combination:

a laser which emits a beam of monochromatic, spatially coherent light, a photosensitive planar holographic surface interposed between the laser and the reflective object and disposed approximately perpendicularly to the axis of the laser beam;

a lens system aligned on an optical axis coincident with the axis of the laser beam to converge the beam to a projection point which is approximately coincident with the photosensitive holographic surface and centrally located thereon, the divergent beam which emanates from the projection point illuminating the reflective object; and a partially reflecting mirror interposed between the photosensitive holographic surface and the reflective object, the partially reflecting mirror being substantially perpendicular to the optical axis and reflecting a portion of the divergent laser beam onto the holographic surface to interfere at the holographic surface with the light reflected from the object onto the holographic surface, the interference patterns being formed thereby being recorded by the photosensitive holographic surface, the difference between the path lengths of the interfering rays falling within the coherence path length of the laser, and a predominance of the interfering rays converging onto the photosensitive holographic surface at narrow angles.

7. Apparatus according to claim 6 in which the interference patterns recorded by the photosensitive holographic surface have maximum spatial frequencies of 200 lines per millimeter.

8. Apparatus according to claim 6 in which the photosensitive holographic surface comprises a photographic emulsion layer on a transparent plate.

9. An apparatus for producing a hologram of a reflective object, the hologram being reconstructed with heterochromatic light, the apparatus comprising:
- a source of a beam of electromagnetic radiation having temporal and spatial coherence;
- a photosensitive holographic surface disposed between the electromagnetic radiation source and the reflective object;
- optical means having an optical axis coincident with the axis of the beam of electromagnetic radiation, for converging the beam to a projection point disposed approximately coincident with the photosensitive holographic surface wherein the divergent beam which emanates after light transmission through the projection point illuminates the reflective object; and
- a beam divider disposed between the reflective object and the holographic surface for dividing the intensity of the divergent beam by passing a portion of the divergent beam to illuminate the reflective object and by reflecting a portion of the divergent beam onto the holographic surface for interference in the holographic surface with the light reflected from a reflective object onto the holographic surface, whereby a large portion of the interfering rays converge onto the holographic surface at narrow angles.

10. The apparatus for producing a hologram of a reflective object as defined in claim 9, wherein:
- the beam divider disposed between the reflective object and the holographic surface is planar.

11. The apparatus for producing a hologram of the reflective object as defined in claim 9, wherein:
- the source of the beam of electromagnetic radiation comprises a laser for emanating monochromatic light.

12. The apparatus for producing a hologram of the reflective object as defined in claim 9, wherein:
- the photosensitive holographic surface is planar and is disposed substantially perpendicular to the optical axis for the beam of electromagnetic radiation to traverse normally thereto approximately at a central location.

13. The apparatus for producing a hologram of the reflective object as defined in claim 9, wherein:
- the beam divider is disposed substantially perpendicular to the optical axis.

* * * * *